(12) United States Patent
Denbo

(10) Patent No.: US 10,032,218 B1
(45) Date of Patent: Jul. 24, 2018

(54) CUSTOMIZED LENDING PRODUCT SYSTEM AND METHOD

(71) Applicant: Wells Fargo Bank, N.A., San Francisco, CA (US)

(72) Inventor: Todd Lawrence Denbo, Larkspur, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 14/055,665

(22) Filed: Oct. 16, 2013

(51) Int. Cl.
*G06Q 40/02* (2012.01)
*G06Q 40/00* (2012.01)

(52) U.S. Cl.
CPC .................... *G06Q 40/025* (2013.01)

(58) Field of Classification Search
None
See application file for complete search history.

(56) References Cited

U.S. PATENT DOCUMENTS

| | | | |
|---|---|---|---|
| 5,940,812 A | 8/1999 | Tengel et al. | |
| 6,029,149 A | 2/2000 | Dykstra et al. | |
| 6,088,686 A | 7/2000 | Walker et al. | |
| 6,988,082 B1 | 1/2006 | Williams et al. | |
| 7,089,503 B1 * | 8/2006 | Bloomquist et al. | 715/780 |
| 7,873,568 B1 * | 1/2011 | Sappington | 705/38 |
| 7,904,332 B1 * | 3/2011 | Merkley et al. | 705/14.1 |
| 8,046,298 B1 | 10/2011 | Voth et al. | |
| 8,321,335 B1 | 11/2012 | Bramlage et al. | |
| 2007/0288359 A1 * | 12/2007 | Amadio | G06Q 40/02 705/38 |
| 2011/0055080 A1 * | 3/2011 | Ahlers et al. | 705/40 |

* cited by examiner

*Primary Examiner* — Robert R Niquette
*Assistant Examiner* — Joseph W. King
(74) *Attorney, Agent, or Firm* — Foley & Lardner LLP

(57) ABSTRACT

A computer-implemented method includes providing an application form configured for electronic display and data entry, receiving loan application data via the form, and providing selectable lending product features based on the loan application data. The selectable lending product features include an approved range of selectable credit options. Each of the selectable credit options has a different associated amount of required collateral. The method also includes receiving feature selection data. The feature selection data includes a selection of at least one of the selectable credit options. The method further includes providing a customized lending product based on the feature selection data.

18 Claims, 6 Drawing Sheets

CUSTOMIZED LENDING PRODUCT SYSTEM AND METHOD

BACKGROUND

Financial institutions such as banks offer a variety of lending products to meet the varying needs of their customers. For example, a financial institution may offer a diverse range of personal lending products including personal loans or lines of credit, secured loans or lines of credit (e.g., secured by a certificate of deposit (CD) or savings account), secured credit cards, student credit cards and overdraft privilege (ODP) loans. Each of these various products may address a particular type of financial need or goal. For example, a personal loan with a fixed annual percentage rate and monthly payment may allow a customer to consolidate and pay down existing high-interest rate debt with reduced interest costs, while a personal line of credit with payments based on an outstanding balance may provide a revolving line of credit that may be used as a source of funds for managing major or unplanned expenses such as home furnishings or medical expenses. Similarly, secured loans and lines of credit may provide an alternative option for customers without an established credit history, or for customers seeking lower annual percentage interest rates or higher borrowing limits.

Given the varying features and objectives of each of these lending products, the requirements, borrowing limits and other terms and conditions for each of these products may vary significantly. For example, secured loans and lines of credit typically require that the customer have an existing CD or savings account with the financial institution that may be used as collateral, while personal loans and lines of credit typically do not have such requirements. Secured loans and lines of credit may, however, provide a higher borrowing limit or lower interest rate than personal loans and lines of credit, and secured lines of credit may have higher minimum borrowing requirements than personal lines of credit. Additional terms and conditions may apply if the customer requires card access to funds.

Customers must often select and apply for a particular lending product without fully understanding whether that particular product is a viable option based on the customer's creditworthiness and desired amount of funding. That is, even if a customer's application for a particular lending product, such as a personal loan, is approved by the financial institution, the customer may not qualify for the either entire amount of funding or the pricing he or she is seeking. The customer would then need to repeat the application process for a different lending product, such as a secured loan, in order to be considered for a larger amount of funding.

Furthermore, while a typical financial institution may offer a wide range of lending products, the particular combination of features included in these lending products may not be the optimum solution to a particular customer's needs. Accordingly, a customer may be required to sacrifice desired features in order to obtain the desired pricing and payment terms and vice versa. There is an ongoing need for improved systems and methods to allow financial institutions to provide lending products that meet the varying needs of their customers.

SUMMARY

According to an exemplary embodiment, a computer-implemented method includes providing an application form configured for electronic display and data entry, receiving loan application data via the form, and providing selectable lending product features based on the loan application data. The selectable lending product features include an approved range of selectable credit options. Each of the selectable credit options has a different associated amount of required collateral. The method also includes receiving feature selection data. The feature selection data includes a selection of at least one of the selectable credit options. The method further includes providing a customized lending product based on the feature selection data.

According to another exemplary embodiment, a computer system includes a processor and machine readable storage media having instructions stored therein. When executed by the processor, the instructions cause the processor to receive loan application data via an application form configured for electronic display and data entry, and to provide selectable lending product features based on an evaluation of the loan application data against lending criteria. The selectable lending product features include an approved range of selectable credit amounts. Each of the selectable credit amounts has a different associated type of required collateral. The instructions are further configured to cause the processor to receive feature selection data including a selection of at least one of the selectable credit amounts, and to provide rate and payment information for a customized lending product based on the feature selection data.

According to another exemplary embodiment, a method includes receiving loan application data via an electronic loan application form configured for display and data entry. The loan application data includes data regarding a user's available collateral. The method also includes providing a range of approved selectable credit amounts based on an evaluation of the loan application data against lending criteria. Each of the selectable credit amounts has a different associated amount and type of required collateral. The method also includes receiving feature selection data including a selection of at least one of the credit amounts, and providing a customized lending product based on the feature selection data.

DETAILED DESCRIPTION

Figure 1:
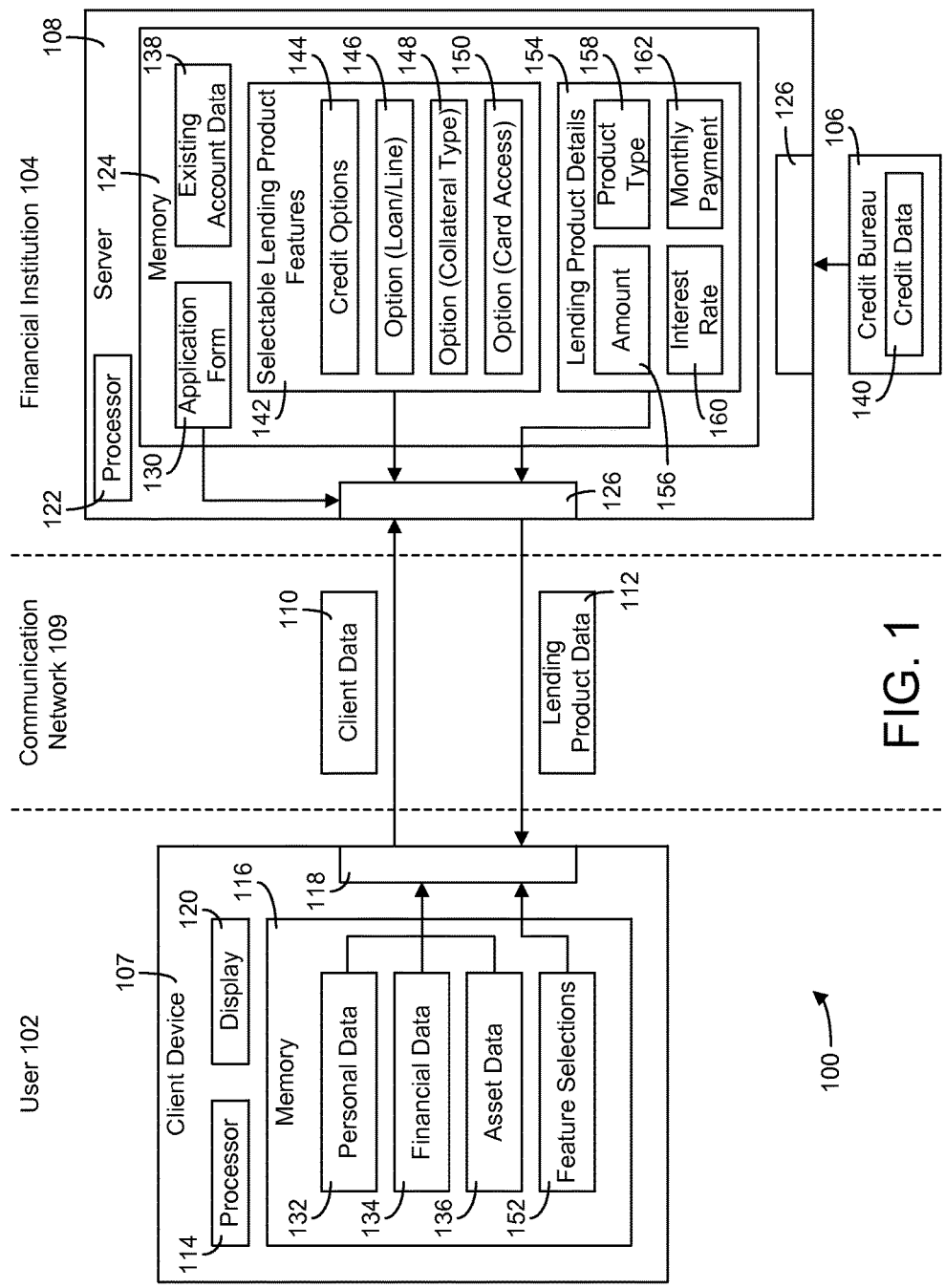
FIG. 1 is a data flow diagram of a process for providing a customized lending product according to an exemplary embodiment.

According to various exemplary embodiments, a customized lending product is provided to individuals, customers, account holders or other types of users attempting to apply for lending products from a financial institution. The user may be presented with a single application form that may be used among multiple lending product types, and in particular, to apply for a customized lending product having features that may be selected from among the various lending product types offered by the financial institution. The application form may, for example, be configured to gather loan application data including information regarding the user's available collateral in addition to other personal and financial data. The loan application data received from the user may then be evaluated against various lending criteria across multiple types of lending products. The financial institution may then provide the user with a number of selectable lending product features based on the evaluation of the loan application data. In particular, the financial institution may provide the user with a number of approved credit options ranging in collateralization amount from, for example, an unsecured lending product to a 100% secured lending product depending on the amount or type of collateral that the user is willing to provide. The financial institution may also provide the user with an additional number of selectable lending product features that may be used to tailor the customized lending product to the user's needs, such as whether the user prefers a loan or a line of credit, or whether the user desires card access to the lending product. Once the user's selections are received, the financial institution provides the user with the details of the customized lending product, including, for example, information regarding the annual percentage rate and monthly payment along with the amount financed via the lending product, the type of lending product selected, and the required collateral selected by the user.

As will be appreciated, the single application form described in the various exemplary embodiments may be used to allow a user to apply for a wide range of customized lending products as opposed to applying separately for a single type of lending product, waiting for a decision from the financial institution, and potentially starting over with a new application for another type of lending product if the first application is rejected. For example, because the user may apply for a wide range of customized lending products via a single application, a user need not apply for a specific unsecured personal loan and run the risk of not qualifying for the loan due to a lack of credit history. The user may avoid the need to complete a new application for a secured loan in order to have his or her available collateral considered because the single application form allows for the user's collateral to be considered for a wide range of customized lending products including secured loans and lines of credit in addition to unsecured personal loans. Accordingly, users need not invest a significant amount of time familiarizing themselves with the various and often complex requirements and nuances among lending product types before applying in order to avoid delays in receiving approval for their desired funds.

As will also be appreciated, moving the selection of lending product features to a point in time after the user is approved for a range of selectable credit options allows the user to avoid the need to select and apply for a particular lending product without fully understanding whether that particular product is a viable option based on the user's creditworthiness and the amount of funding needed. Instead, users are presented with an up-front indication of the amount of approved credit they can access based on, for example, the amount or type of collateral they choose to provide. Accordingly, a user need not be confronted with having to repeat the application process in a situation where their application for a particular lending product, such as an unsecured personal loan, is approved by the financial institution, but not for the desired amount of funding. Instead, the user may automatically be considered for higher funding amounts based on the same application depending on the amount and/or type of collateral they are willing to provide.

As will further be appreciated, allowing the user to interactively select particular customized lending product features may allow the user to avoid having to choose among specific lending products that may not be the optimum solution to that particular user's needs. The user need not sacrifice desired features in order to obtain the desired pricing and payment terms or vice versa.

FIG. 1 is a data flow diagram illustrating a process 100 for providing a customized lending product 101 according to an exemplary embodiment. While process 100 is generally described in the context of a remote user computing device in communication with a financial institution via a secure online financial system, it will be appreciated that other computing systems, such as a user's mobile device in communication with an "in-store" banking system are contemplated as well.

FIG. 1 generally illustrates an embodiment of process 100 wherein data is exchanged between a user 102, such as an online banking customer, and a financial institution 104, such as a bank or other financial institution with additional input from a credit bureau 106. User 102 may typically exchange data with financial institution 104 using a client device 107 in communication with a server 108 via a communication network 109. Client device 107 may generally be operated by user 102 to provide client data 110 to financial institution 104, and to receive lending product data 112 from financial institution 104.

Client device 107 may be of any number of different types of electronic devices configured to communicate via network 109. For example, client device 107 may be a desktop computer (e.g., a computing device intended to remain stationary during use). In another example, client device 107 may be a mobile device (e.g., a computing device which can be moved during use such as a tablet computing device, a cellular phone, a laptop computer, or the like). Client device 107 may include a processing circuit that includes a processor configured to execute machine instructions stored in a memory. For example, client device 107 may include a processor 114 and memory 116.

The processing circuits of client devices 107 may also include a hardware interface 118. Interface 118 may be configured to receive or transmit data via communication network 109, other networks, or user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, a motion-sensor, etc.). For example, interface 118 of client device 107 may receive input data from a pointing device, such as a mouse. The one or more user interface devices may be internal to the housings of client device 107 (e.g., built-in displays, microphones, etc.) or external to the housings of client device 107 (e.g., a monitor connected to client device 107, a speaker connected to client device 107, etc.), according to various implementations.

In some embodiments, client device 107 may include an electronic display 120. Electronic display 120 may be a touch-sensitive display (e.g., capacitance-sensitive displays, resistance-sensitive displays, etc.) that both receives information from, and conveys information to, user 102. In other embodiments, electronic display 120 may only convey information to user 102 (e.g., the displays are not touch-sensitive).

Server 108 may be a computing device having a processing circuit that includes a processor 122 configured to execute machine instructions stored in a memory 124. Server 108 may also include one or more hardware interfaces 126 configured to receive data and/or to communicate data to another device (e.g., to or from a user interface device, to or from communication network 109, etc.). In some embodiments, server 108 may be implemented using multiple computing devices. For example, server 108 may be implemented using multiple servers, one or more data centers, as a cloud computing environment, or the like. In such cases, processor 122 represents the collective set of processors of the devices and memory 124 represents the collective set of data storage devices.

According to various embodiments, server 108 may be configured to provide lending product data 112 to client device 107 and to receive client data 110 from client device 107. For example, client device 107 may present one or more input screens to display 120 that allow user 102 to input various client data 110. An input screen may be provided to display 120 by a stand-alone application stored and executed locally by client device 107 or may be provided to client device 107 by server 108 (e.g., as a thin client, as a webpage, etc.). Server 108 may also be configured to use client data 110 for purposes of generating a customized lending product 101.

Communication network 109 may be any form of data network that relays information between client device 107 and expense management server 108. For example, communication network 109 may include the Internet and/or other types of data networks, such as a local area network (LAN), a wide area network (WAN), a cellular network, satellite network, etc. Communication network 109 may also include any number of computing devices (e.g., computer, servers, routers, network switches, etc.) that are configured to receive and/or transmit data within communication network 109. In other words, communication network 109 may include other devices configured to relay data between client device 107 and server 108. Communication network 109 may include any number of hardwired and/or wireless connections. For example, client device 107 may communicate wirelessly (e.g., via WiFi, cellular, radio, etc.) with a transceiver that is hardwired (e.g., via a fiber optic cable, a CAT5 cable, etc.) to other devices in communication network 109. In addition to client device 107 and server 108, communication network 109 may be configured to relay data between any number of different computing devices.

Process 100 may begin with user 102 requesting a loan application via an online banking system. For example, user 102 may have need for a lending product that will provide $10,000 to meet future cash flow needs. User 102 may proceed to access an online website hosted by financial institution 104 on server 108 and selecting an appropriate hyperlink from a web page in order to obtain a loan application. Financial institution 104 may respond to the request from user 102 by providing lending product data 112 in the form of an electronic application form 130.

Application form 130 may be a loan application form configured for display on client device 107 operated by user 102. Application form 130 may be further configured for data entry such that user 102 may provide client data 110 to financial institution 104 in the form of loan application data 131. For example, application form 130 may be provided to display 120 by a stand-alone application stored and executed locally by client device 107 or may be provided to client device 107 by server 108 (e.g., as a thin client, as a webpage, etc.). In some embodiments, application form 130 may be formatted as a PDF or HTML document capable of being displayed on client device 107, and further configured for entry of client data 110.

Application form 130 may be configured for use among multiple lending products offered by financial institution 104. That is, application form 130 may be used by user 102 to apply for a diverse range of lending products, such as home equity loans and lines of credit, auto loans and lines of credit, personal loans or lines of credit, secured loans or lines of credit (e.g., secured by a certificate of deposit (CD) or savings account), secured credit cards, student credit cards, overdraft privilege (ODP) loans, and mortgage products. According to an exemplary embodiment, application form 130 is configured to allow user 102 to apply for a customized lending product 101 having features that may be selected from among various lending products offered by the financial institution. To this end, application form 130 may be configured to receive loan application data 131 from user 102. Loan application data may include data such as personal data 132, financial data 134, as well as asset data 136. Application form 130 is preferably configured to receive a set of application data from user 102 such that it can facilitate application for lending products offered by financial institution 104 having the most robust application requirements, such as for a mortgage product, while at the same time receiving data regarding all available types of collateral, ranging from savings assets to autos and home equity.

Upon receiving application form 130 from financial institution 104, user 102 may provide financial institution 104 with loan application data 131, including personal data 132, financial data 134, and asset data 136 for user 102 and any joint applicants. Personal data 132 may include, for example, current contact information including an address, home phone number, work phone number, and cell phone number, and an email address that may be used to contact user 102 in the event that questions arise during or after the application process. Personal data 132 may also include a social security number. Financial data 134 may include, for example, information regarding a monthly or annual income as well as any personal debt or other liabilities. Financial data 134 may also include the amount of funds requested by user 102. Asset data 136 may include, for example, data regarding the value and type of any assets that user 102 may be willing to provide as collateral. Such assets may include, for example, real property, such as land and improvements (e.g., a home or rental property in which user 102 holds equity). Such assets may also include tangible personal property, (e.g., a vehicle such as an automobile), as well as intangible personal property, including negotiable instruments and securities (e.g., a CD) as well as deposit accounts. For example, user 102 may have a current CD with financial institution 104 as well as significant equity in a home he or she is willing to provide as collateral in order to secure a $10,000 lending product to meet future cash flow needs. Upon completion of application form 130, user 102 may save loan application data 131 and send the completed application form 130 as client data 110 to financial institution 104.

Figure 2:
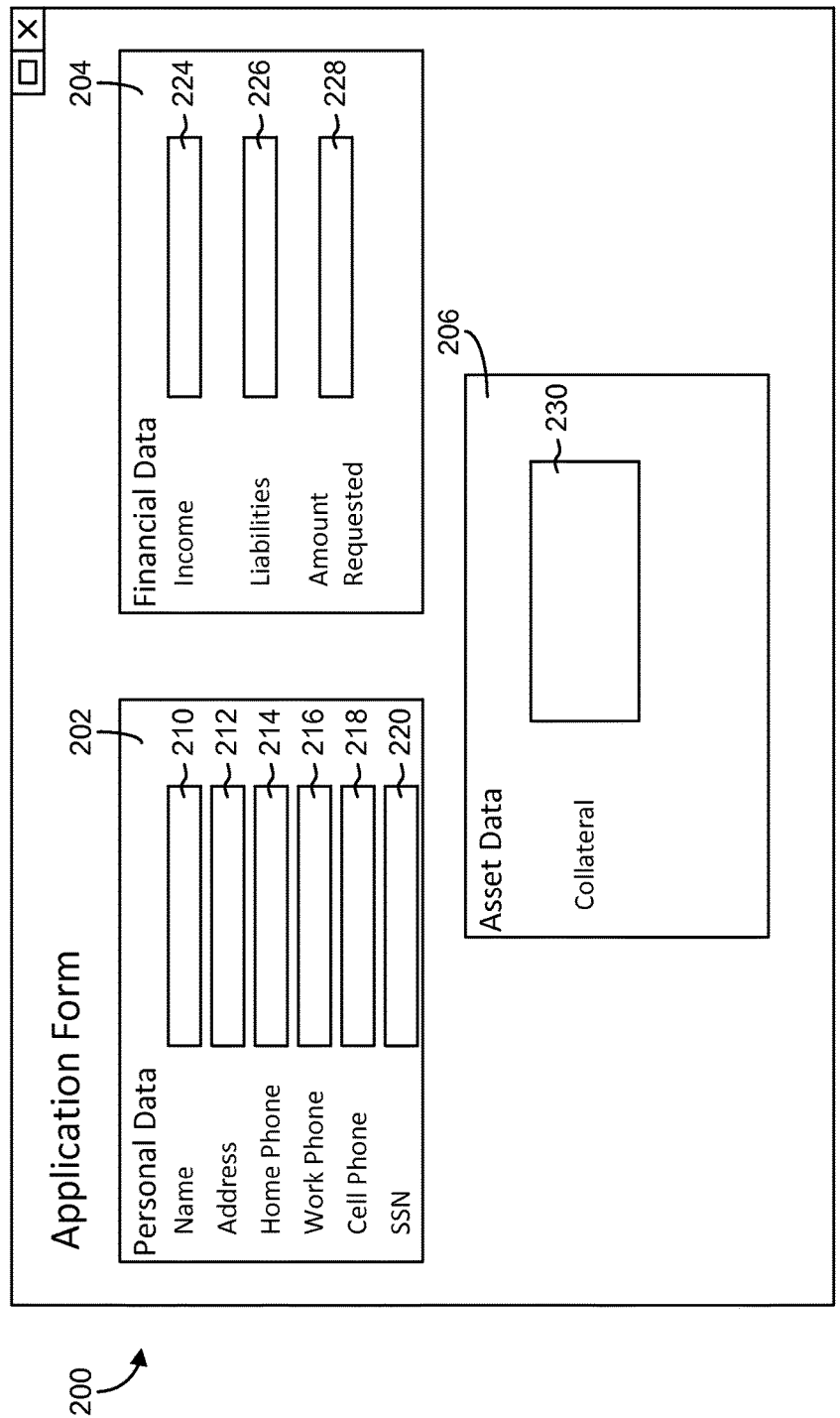
FIG. 2 is a depiction of an application form that may be used to receive application data for a customized lending product according to an exemplary embodiment.

Referring now to FIG. 2, an application form 200 that may be used to receive loan application data for a customized lending product according to an exemplary embodiment is shown. Application form 200 may include any number of different input fields configured to receive data from a user interface device, such as a keypad (e.g., a physical or virtual keypad), mouse or other pointing device, or touch screen display. As shown in FIG. 2, application form 200 may include input sections 202, 204, and 206 corresponding to loan application data such as personal data, financial data, and asset data. Section 202 may include input fields for personal data such as a field 210 for a first and last name, a field 212 for an address, a field 214 for a home phone number, a field 216 for a work phone number, a field 218 for a cell phone number, and a field 220 for an email address. A field 222 for a social security number may also be included.

Section 204 may include input fields for financial data such as a field 224 for information regarding a monthly or annual income. Section 204 may also include an input field 226 for information regarding any personal debt or other liabilities. Section 204 may also include a field 228 for an amount of funds requested by user 102. Section 206 may include an input field 230 for data regarding the value and type of any assets that user 102 may be willing to provide as collateral.

Referring again to FIG. 1, upon receipt of loan application data 131 from user 102 via application form 130, financial institution 104 may additionally gather existing account data 138 associated with user 102. Existing account data 138 may be information regarding any financial products issued by financial institution 104 that may be owned by user 102. By way of example, financial institution 104 may gather information regarding a CD owned by user 102 as well as information regarding a current mortgage product held by user 102. Existing account data 138 may include, for example, information regarding the amount owed on any lending products, the number of past overdrafts on any accounts, the number and respective values or balances of different accounts, and the length of the existing relationship between financial institution 104 and user 102.

Financial institution 104 may further request credit data 140 for user 102 from credit bureau 106. Credit data 140 may include for example, a credit history or a credit score for user 102, such as a credit score provided by Equifax, TransUnion and Experian. According to an exemplary embodiment, financial institution 104 may determine its own credit score for user 102 using personal data 132, financial data 134, and asset data 136 received from user 102 via application form 130 in combination with credit data 140. The credit score may be generated by an automated model that estimated the creditworthiness of user 102 and any other applicants.

Financial institution 104 may then determine a number of selectable lending product features 142 for user 102 based on an evaluation of loan application data 131 in combination with existing account data 138 and credit data 140. In particular, financial institution 104 may determine a range of credit options 144 from among which user 102 may make a selection. Credit options 144 may include a number of credit amounts, each credit amount having an associated amount and/or type of required collateral. Credit options 144 may range in collateralization amount from an unsecured lending product to a 100% secured lending product depending on the amount or type of collateral that the user is willing to provide. According to an exemplary embodiment, financial institution 104 performs an underwriting process that compares personal data 112, financial data 134, asset data 136, and credit data 140 for user 102 with lending criteria for various lending product features provided by financial institution 104. The output of the underwriting process is an "approved" range of approved credit options 144 from among which user 102 may make a selection. For example, financial institution 104 may provide user 102 with a range of credit options 144 including an unsecured lending product for a base amount of $7500, a 50% secured lending product for an amount of $10,000 secured by a CD owned by user 102, and a 100% secured loan for $20,000 secured against equity in a home owned by user 102.

Financial institution 104 may also provide the user with an additional number of selectable lending product features 142 that may be used to tailor the customized lending product 101 to the needs of user 102. For example, as shown in FIG. 1, selectable lending product features 142 may include a selectable option 146 allowing user 102 to choose a loan or a line of credit, a selectable option 148 allowing user 102 to choose a type of collateral used for security (if not specified in credit options 144), such as a CD or savings account, or an automobile, or home equity. Selectable lending product features 142 may further include a selectable option 150 allowing user 102 to choose whether card access to the customized lending product 101 is desired.

As with application form 130, selectable lending product features 142 may be provided to user 102 as lending product data 112 in a format configured for display on client device 107. For example, selectable lending product features 142 may be provided to display 120 of client device 107 by a stand-alone application stored and executed locally by client device 107 or may be provided to client device 107 by server 108 (e.g., as a thin client, as a webpage, etc.). In some embodiments, selectable lending product features 142 may be formatted as a PDF or HTML document capable of being displayed on client device 107, and further configured for entry of client data 110.

Figure 3:
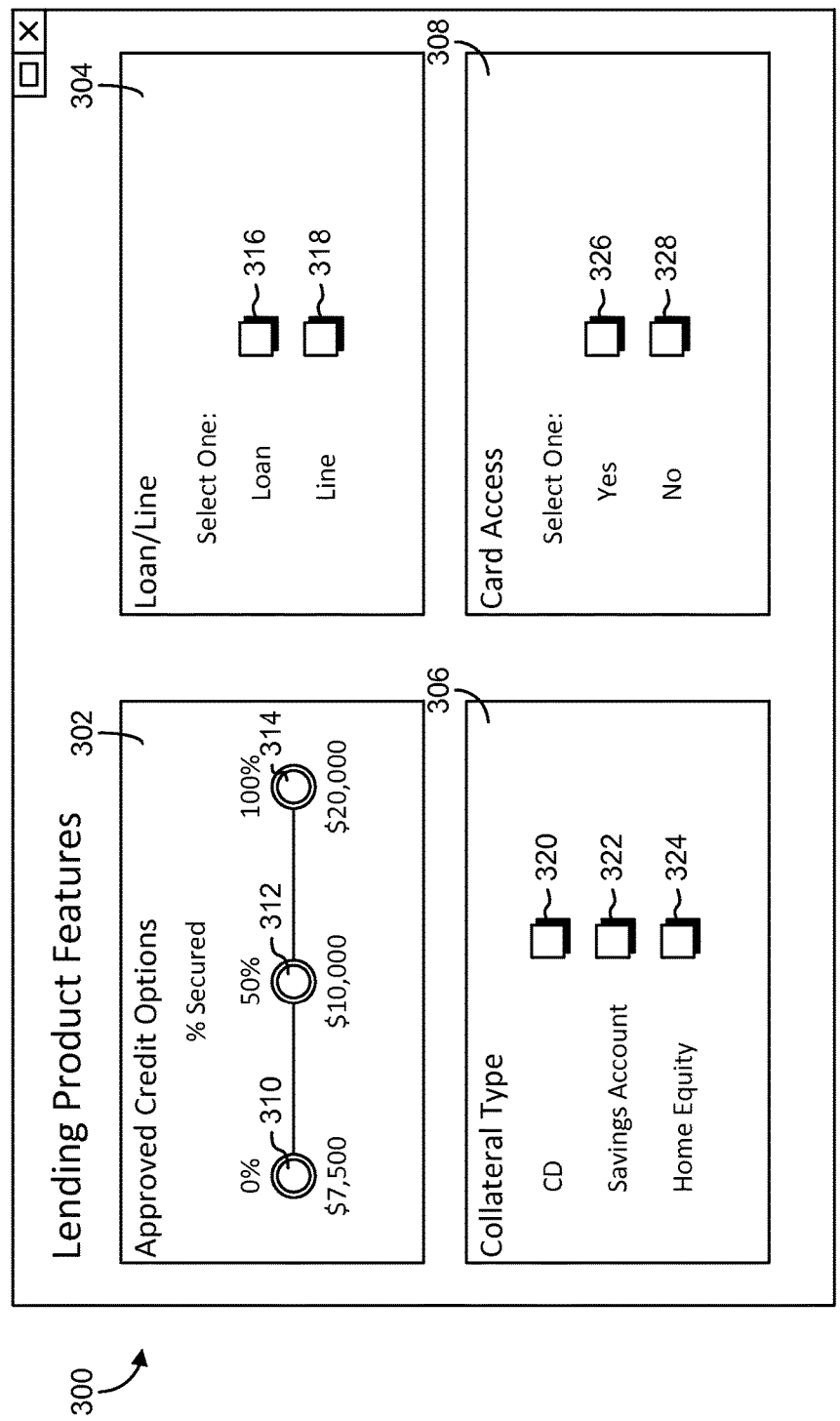
FIG. 3 is a depiction of a user interface that may be used to present a user with selectable features for a customized lending product according to an exemplary embodiment.

Referring now to FIG. 3, a user interface 300 that may be used to present a user with selectable features for a customized lending product according to an exemplary embodiment is shown. User interface 300 may include any number of different input fields configured to receive data from a user interface device, such as a keypad (e.g., a physical or virtual keypad), mouse or other pointing device, or touch screen display. As shown in FIG. 3, user interface 300 may include input sections 302, 304, 306, and 308 respectively corresponding to a range of approved credit options, a selectable option for a loan or a line of credit, a selectable option for a type of collateral used for security, and a selectable option for whether card access to the customized lending product is desired.

Section 302 may include input fields in the form of selectable objects (e.g., radio buttons or check boxes) corresponding to a number of approved credit amounts, each credit amount having an associated amount and/or type of required collateral. For example, in the illustrated embodiment, section 302 includes selectable objects 310, 312, and 314 respectively corresponding to an unsecured lending product for a base amount of $7500, a 50% secured lending product for an amount of $10,000, and a 100% secured loan for $20,000. Fewer or additional options may also be provided. Likewise, the credit amount and the percent secured may also be shown as separately selectable options. Section 304 may include input fields in the form of selectable objects (e.g., radio buttons or check boxes) corresponding to a choice of a loan or a line of credit. For example, in the illustrated embodiment, section 304 includes selectable objects 316 and 318 respectively corresponding to a loan and a line of credit.

Section 306 may include input fields in the form of selectable objects (e.g., radio buttons or check boxes) corresponding to a choice of a collateral to secure the customized lending product. For example, in the illustrated embodiment, section 306 includes selectable objects 320, 322, and 324 respectively corresponding to a CD, a savings account, and home equity. In some embodiments, section 306 may be omitted, such as where the type of collateral is specified for each selectable credit option in section 304. For example, section 304 may specify that a 50% secured lending product for an amount of $10,000 is secured by a CD, and that a 100% secured loan for $20,000 is secured against equity in a home. Section 308 may include input fields in the form of selectable objects (e.g., radio buttons or check boxes) corresponding to a choice of whether card access to funds from the customized lending product is desired. For example, in the illustrated embodiment, section 308 includes selectable objects 326 and 328 respectively corresponding to yes and no for card access.

Referring again to FIG. 1, upon receiving selectable lending product features 142 from financial institution 104, user 102 may provide financial institution 104 with client data 110 in the form of feature selection data 152. Feature selection data 152 may include selections made by user 102 regarding selectable lending product features 142 based on, for example, current preferences or needs. Such selected features may include a desired loan amount and/or amount and type of collateral. For example, in the scenario where user 102 is in need of future cash flow in the amount of $10,000, user 102 may provide asset data 136 via application form 100 indicating that a current CD as well as home equity owned by user 102 are available as collateral. Financial institution 104 may, after evaluating loan application data 131 received from user 102 against lending criteria for various lending product features, provide user 102 with a range of credit options 144 including an unsecured lending product for an amount of $7500, a 50% secured lending product for an amount of $10,000 secured by the CD owned by user 102, and a 100% secured loan for $20,000 secured against equity in the home owned by user 102. Financial institution 104 may further provide a selectable option 146 allowing user 102 to choose a loan or a line of credit. User 102 may, accordingly, provide feature selection data 152 to financial institution 104 indicating a selection of the 50% secured lending product in the amount of $10,000 (secured by the CD owned by user 102) from credit options 144, and further indicating a selection of a line of credit from selectable option 146.

In response to receipt of feature selection data 152 from user 102, financial institution 104 may provide user 102 with customized lending product 101. According to an exemplary embodiment, financial institution 104 may provide user 102 with a communication confirming the details 140 of customized lending product 101. Such details 140 may include a lending product amount 156, including any associated security and collateral requirements. Lending product amount 142 may correspond to a user selection 152 made by user 102 in response to selectable credit options 144. Details 154 may also include a lending product type 158 corresponding to, for example, a user selection 152 in response to a selectable option 146 for a loan or line of credit. Details 154 may further include interest rate information 160, such as an annual percentage rate, as well as monthly payment information and/or term information 162. Other user selections and details may be confirmed as well, such as whether card access is included.

As with application form 130, details 140 of customized lending product 101 may be provided to user 102 as lending product data 112 in a format configured for display on client device 107. For example, details 140 of customized lending product 101 may be provided to display 120 of client device 107 by a stand-alone application stored and executed locally by client device 107 or may be provided to client device 107 by server 108 (e.g., as a thin client, as a webpage, etc.). In some embodiments, details 140 of customized lending product 101 may be formatted as a PDF or HTML document capable of being displayed on client device 107, and further configured for entry of client data 110.

Figure 4:
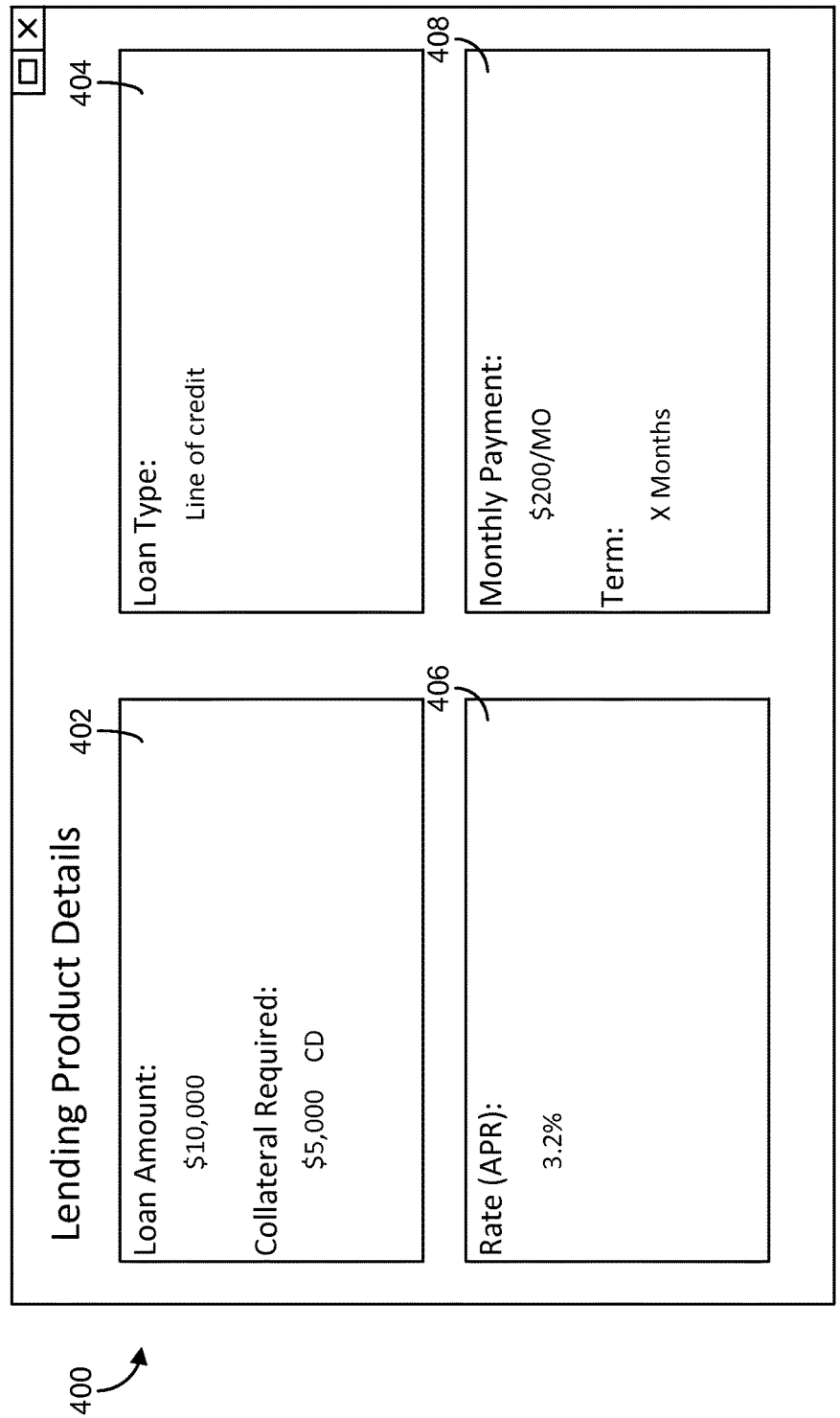
FIG. 4 is a depiction of a user interface that may be used to present a user with the details for a customized lending product according to an exemplary embodiment.

Referring now to FIG. 4, a user interface 400 that may be used to present a user with the details for a customized lending product according to an exemplary embodiment is shown. As shown in FIG. 4, user interface 400 may include sections 402, 404, 406, and 408 respectively corresponding to a lending product amount including any associated collateral requirements, a lending product type, interest rate information, and monthly payment information.

Figure 5:
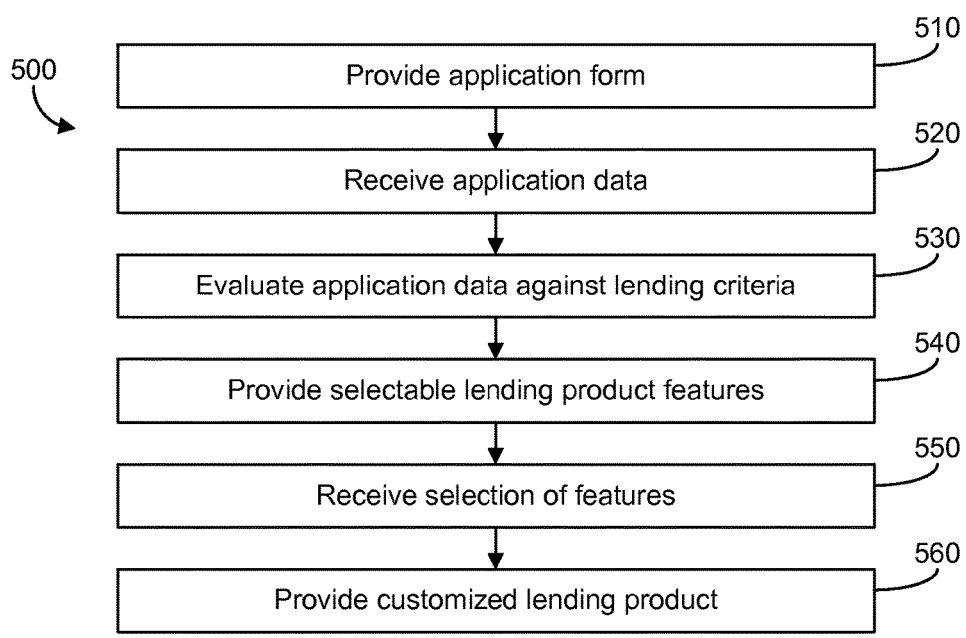
FIG. 5 is a flowchart of a process for providing a customized lending product according to an exemplary embodiment.

FIG. 5 is a flowchart of a process 500 for providing a customized lending product according to an exemplary embodiment. At a step 510, a user may be provided with an application form which may be configured for electronic display and data entry. The application form may be provided, for example, by a financial institution in response to a user request for a loan application form via an online banking application. The user may then complete the application form by providing, for example, personal data, financial data, and asset data for the user and any joint applicants.

At a step 520, loan application data from the user may be received by the financial institution via the application form. The financial institution may additionally gather existing account data associated with the user, such as information regarding any financial products issued by the financial institution that may be owned by the user. The financial institution may further request credit data for the user from a credit bureau, which may include for example, a credit history or a credit score for the user. The financial institution may also determine its own credit score for the user as described above.

At a step 530, application data received from the user may be evaluated against lending criteria, and at a step 540, the user may be provided with selectable lending product features based on the application data. In particular, the financial institution may provide a range of approved credit options from among which the user may make a selection. The approved credit options may include a number of approved credit amounts, each credit amount having an associated amount and/or type of required collateral. The financial institution may also provide the user with an additional number of selectable lending product features that may be used to tailor the customized lending product. For example, the selectable lending product features may include selectable options allowing the user to choose a loan or a line of credit, a type of collateral used for security (such as a CD or savings account, or an automobile, or home equity), and whether card access to the customized lending product is required.

At a step 550, feature selection data including a selection of at least one of the features may be received by the financial institution from the user. For example, the financial institution may receive the user's selection of one of the approved credit options and also a selection of either a loan or a line of credit. The financial institution may also receive a selection indicating that card access to the customized lending product is requested.

At a step 560, the user may be provided with a customized lending product based on the selected feature. For example, the financial institution may provide the user with a communication confirming the details of the customized lending product. Such details may include, for example, a lending product amount including any associated security and collateral requirements, a lending product type, interest rate information, and monthly payment information.

Figure 6:
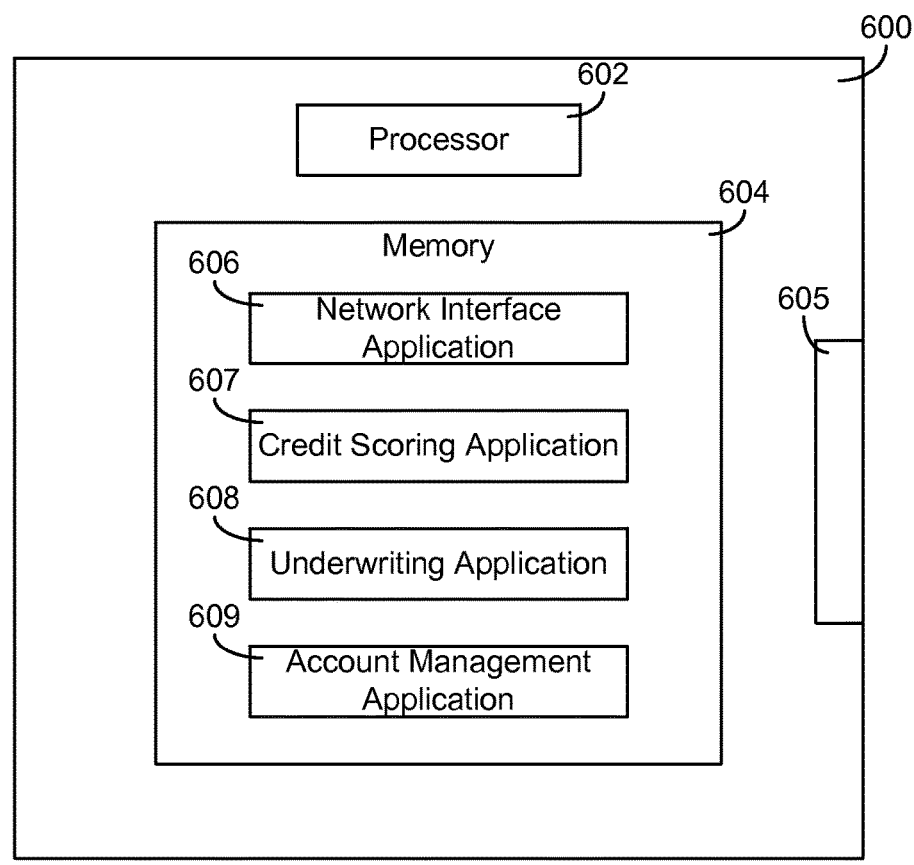
FIG. 6 is a block diagram illustrating a system for providing a customized lending product according to an exemplary embodiment.

FIG. 6 is a block diagram illustrating a processing circuit 600 for providing a customized lending product according to an exemplary embodiment. Processing circuit 600 may be part of a financial institution computer system (e.g., server 108 shown in FIG. 1). Processing circuit 600 includes a processor 602 and a memory 604. Processor 602 may be, or may include, one or more microprocessors, application specific integrated circuits (ASICs), circuits containing one or more processing components, a group of distributed processing components, circuitry for supporting a microprocessor, or other hardware configured for processing. According to an exemplary embodiment, processor 602 is configured to execute computer code stored in memory 604 to complete and facilitate the activities described herein. Memory 604 can be any volatile or non-volatile computer-readable storage medium capable of storing data or computer code relating to the activities described herein. For example, memory 604 is shown to include applications 606, 607, 608, and 609 which are computer code modules (e.g., executable code, object code, source code, script code, machine code, etc.) configured for execution by processor 602. Memory 604 may also store client data, lending product data, account data and credit data relating to the activities described herein. According to some embodiments, processing circuit 600 may represent a collection of processing devices (e.g., servers, data centers, etc.). In such cases, processor 602 represents the collective processors of the devices and memory 604 represents the collective storage devices of the devices. When executed by processor 602, processing circuit 600 is configured to complete the activities described herein.

Processing circuit 600 includes hardware circuitry for supporting the execution of the computer code of applications 606, 607, 608, and 609. For example, processing circuit 600 is shown to include one or more hardware interfaces 612. Hardware interface 612 may include hardware to receive data from a network or serial BUS and to communicate data to another processing circuit via a network or serial BUS. Hardware interface 612 may be configured to receive or transmit data wirelessly (e.g., via radio signals, via infrared signals, etc.) or over a hardwired connection (e.g., a CAT5 cable, a fiber optic cable, etc.). For example, hardware interface 612 may receive client data from another computing device via a network connection. Hardware interface 612 may also communicate lending product data to other devices. In some embodiments, hardware interface 606 may be configured to receive data from, or transmit data to, a user interaction device (e.g., a display, a mouse or other pointing device, etc.).

Memory 604 may include a network interface application 606. Network interface application 606 may, for example, be configured to interface with other computing devices via the Internet or other publicly accessible communication networks through an online website associated with the financial institution. For example, network interface application 606 may be configured to generate a graphical user interface, such as one or more dynamically generated web pages presented to users via browser applications operating on a client device. The graphical user interface may prompt users to take certain actions and may receive user inputs provided in response to such prompting. Network interface application 606 may also comprise other logic configured to provide an interface for other types of devices such as mobile devices. Network interface application 606 may also be configured to interface processing circuit 600 with "in-store" computers associated with the financial institution via an internal network.

Memory 604 may also include a credit scoring application 607 and an underwriting application 608. Credit scoring application 607 may be configured to determine a credit score using an automated model or algorithm. Credit scoring application 607 may determine a credit score for a user using, for example, client data such as personal, financial, and asset data in combination with credit data received from a credit bureau. Underwriting application 608 may be configured to perform an underwriting process that compares personal, financial, asset, and credit data for a user with lending criteria for various lending product features provided by the financial institution in accordance with the activities contemplated herein.

Memory 604 may also include an account management application 609. Account management application 609 may be configured to perform various tasks in connection with lending products held at the financial institution. For example, account management application 609 may perform credits and debits associated with various lending products, maintain account balances and transaction histories, and manage personal, financial, asset and credit data associated with the various lending products.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

Embodiments within the scope of the present invention may include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A computer-implemented method for providing a customized lending product via a graphical user interface displayed in a client device, comprising:
   providing, by processing circuitry of a financial institution computing system associated with a financial institution, a hyperlink to a lending product application, the hyperlink being accessible by a client device associated with a user;
   providing, by the processing circuitry of the financial institution computing system to a graphical user interface of the client device, an electronic application form in response to a user selecting the hyperlink, the electronic application comprising a personal data input section, a financial data input section, and an asset data input section that are displayed in the graphical user interface of the client device, each of the personal data, financial data and asset data input sections instructing the user to enter data into the application form, wherein the user is applying for a loan;

receiving, by the processing circuitry of the financial institution computing system and from the client device, loan application data via the application form, the loan application data based on the information provided in the input sections of the application and including user financial data and asset data related to assets the user is willing to provide as collateral;

identifying, by the processing circuitry of the financial institution computing system, one or more lending products offered by the financial institution that the user qualifies for based on the received loan application data;

pre-approving, by the processing circuitry of the financial institution computing system, the user for each of the one or more identified lending products;

providing, by the processing circuitry of the financial institution computing system to the client device, selectable lending product features via the graphical user interface displayed in the client device, each of the selectable lending product features relating to the one or more identified, pre-approved lending products, the selectable lending product features including a range of selectable credit amounts, each of the selectable credit amounts having a different percentage of required collateral;

receiving, by the processing circuitry of the financial institution computing system from the client device, feature selection data provided by the user via the graphical user interface displayed in the client device, the feature selection data including a selection of at least one of the selectable credit amounts;

selecting, by the processing circuitry of the financial institution computing system, a pre-approved customized lending product from the one or more identified, pre-approved lending products based on the feature selection data; and providing, by the processing circuitry of the financial institution computing system to the client device, a webpage confirming the details of the pre-approved customized lending product, the communication including an indication of the selected credit amount including any associated security and collateral requirements for the pre-approved customized lending product.

2. The method of claim 1, further comprising evaluating, by the financial institution computing system, the loan application data against lending criteria in order to determine the selectable lending product features.

3. The method of claim 1, wherein receiving the feature selection data includes receiving a selection of one of a loan and a line of credit.

4. The method of claim 1, wherein providing the customized lending product includes providing at least one of an interest rate and a payment amount.

5. The method of claim 1, wherein receiving the feature selection data includes receiving a selection requesting card access to the customized lending product.

6. The method of claim 1, wherein the selected collateral type is at least one of real property, tangible personal property and intangible personal property.

7. The method of claim 1, wherein providing the application form, the selectable lending product features, and the customized lending product includes providing the application form, the selectable lending product features, and the customized lending product via an online financial institution website.

8. A financial institution computer system associated with a financial institution, the financial institution computer system comprising:

processing circuitry; and machine readable storage media having instructions stored therein that, when executed by the processing circuitry, cause the processing circuitry to:

provide a hyperlink to a lending product application, the hyperlink being accessible by a client device associated with a user;

provide, to a graphical user interface of the client device, an electronic application form in response to a user selecting the hyperlink, the electronic application comprising a personal data input section, a financial data input section, and an asset data input section that are displayed in the graphical user interface of the client device, each of the personal data, financial data and asset data input sections instructing the user to enter data into the application form, wherein the user is applying for a loan;

receive, from the client device, loan application data via the application form, the loan application data based on the information provided in the input sections of the application and including user financial data and asset data related to assets the user is willing to provide as collateral;

identify, based the loan application data, one or more lending products offered by the financial institution that the user qualifies for;

pre-approve the user for each of the one or more identified lending products;

provide, to the client device, selectable lending product features via the graphical user interface displayed in the client device, each of the selectable lending product features relating to the one or more identified, pre-approved lending products, the selectable lending product features including a range of selectable credit amounts, each of the selectable credit amounts having a different percentage of required collateral;

receive, from the client device, feature selection data including a selection of at least one of the selectable credit amounts via the graphical user interface displayed in the client device;

select, from the one or more identified, pre-approved lending products, a pre-approved customized lending product based on the feature selection data; and provide, to the client device, a webpage confirming the details of the pre-approved customized lending product, the communication including rate and payment information for the pre-approved customized lending product.

9. The system of claim 8, wherein the selectable lending product features include a selection of a loan and a line of credit.

10. The system of claim 8, wherein the selectable lending product features include a selection requesting card access to the customized lending product.

11. The system of claim 8, wherein the associated types of collateral include at least one of a savings account, a certificate of deposit, an automobile, and real estate.

12. The system of claim 8, wherein a processor is associated with an online financial institution website.

13. A method for providing a customized lending product via a graphical user interface displayed in a client device, comprising:

provinding, by processing circuitry of a financial institution computing system associated with a financial institution, a hyperlink to a lending product application, the hyperlink being accessible by a client device associated with a user;

providing, by the processing circuitry of the financial institution computing system to a graphical user interface of the client device, an electronic application form in response to a user selecting the hyperlink, the electronic application comprising a personal data input section, a financial data input section, and an asset data input section that are displayed in the graphical user interface of the client device, each of the personal data, financial data and asset data input sections instructing the user to enter data into the application form, wherein the user is applying for a loan;

receiving, by the processing circuitry of the financial institution computing system and from the client device loan application data via the electronic loan application, wherein the loan application data is based on the information provided in the input sections of the application and includes user financial data and asset data related to assets the user is willing to provide as collateral;

identifying, by the processing circuitry of the financial institution computing system, one or more lending products offered by the financial institution that the user qualifies for based on an evaluation of the received loan application data against lending criteria;

pre-approving, by the processing circuitry of the financial institution computing system, the user for each of the one or more identified lending products;

providing, by the processing circuitry of the financial institution computing system to the client device, a range of selectable credit amounts via the graphical user interface displayed in the client device, where each of the selectable credit amounts has a different associated percentage and type of required collateral, and each of the selectable credit amounts relates to a different identified, pre-approved lending product;

receiving, by the processing circuitry of the financial institution computing system from the client device, feature selection data via the graphical user interface displayed in the client device, the feature selection data including a selection of at least one of the credit amounts;

selecting, by the processing circuitry of the financial institution computing system, a pre-approved customized lending product from the one or more identified, pre-approved lending products based on the feature selection data; and providing, by the processing circuitry of the financial institution computing system to the client device, a webpage confirming the details of a pre-approved customized lending product.

14. The method of claim 13, further comprising providing, by the financial institution computing system, selectable lending product features including at least one of a loan and a line of credit.

15. The method of claim 13, wherein providing the customized lending product includes providing at least one of an interest rate and a monthly payment amount.

16. The method of claim 13, further comprising providing, by the financial institution computing system, selectable lending product features including a selection for card access to the customized lending product.

17. The method of claim 13, wherein the type of collateral includes at least one of a savings account, a certificate of deposit, an automobile, and real estate.

18. The method of claim 13, wherein the loan application data and the feature selection data are received via an online financial institution website.

* * * * *